US010332668B2

(12) United States Patent
Lu et al.

(10) Patent No.: US 10,332,668 B2
(45) Date of Patent: Jun. 25, 2019

(54) COPPER WINDING STRUCTURE, TRANSFORMER AND FULL-WAVE RECTIFIER CIRCUIT HAVING THE SAME

(71) Applicant: Delta Electronics (Shanghai) Co.,Ltd., Shanghai (CN)

(72) Inventors: Zengyi Lu, Shanghai (CN); Xingkuan Guo, Shanghai (CN); Chunmei Wang, Shanghai (CN); Jun Sun, Shanghai (CN)

(73) Assignee: DELTA ELECTRONICS (SHANGHAI) CO.,LTD., Shanghai (CN)

( * ) Notice: Subject to any disclaimer, the term of this patent is extended or adjusted under 35 U.S.C. 154(b) by 0 days.

(21) Appl. No.: 15/975,768

(22) Filed: May 10, 2018

(65) Prior Publication Data
US 2019/0115141 A1    Apr. 18, 2019

(30) Foreign Application Priority Data
Oct. 18, 2017    (CN) ..................... 2017 2 1341921 U

(51) Int. Cl.
*H01F 27/28* (2006.01)
*H02M 7/217* (2006.01)
*H01F 27/29* (2006.01)
*H01F 27/24* (2006.01)
*H02M 1/44* (2007.01)

(52) U.S. Cl.
CPC ............. *H01F 27/28* (2013.01); *H01F 27/24* (2013.01); *H01F 27/29* (2013.01); *H02M 1/44* (2013.01); *H02M 7/217* (2013.01)

(58) Field of Classification Search
CPC ......... H03K 17/08104; H03K 17/0812; H03K 17/691; H02M 1/08; H02M 7/217; H02M 1/12; H02M 1/14; H02M 1/126; H02M 1/4208; H02M 1/4225; H02M 1/44; H01F 27/28; H01F 27/29; H01F 27/32; H01F 27/24; H01F 27/306; H01F 27/324; H01F 27/2823; H01F 27/2847; H01F 27/2852; H01F 27/2866
USPC ........... 336/180, 192, 198, 200, 212; 363/44
See application file for complete search history.

(56) References Cited

U.S. PATENT DOCUMENTS

| 5,168,440 | A * | 12/1992 | Spreen ................ H01F 27/2847 336/226 |
| 7,705,705 | B2 * | 4/2010 | Zeng ................... H01F 27/2804 336/212 |
| 2005/0212640 | A1 * | 9/2005 | Chiang ............... H01F 27/2804 336/200 |

(Continued)

*Primary Examiner* — Yemane Mehari
(74) *Attorney, Agent, or Firm* — CKC & Partners Co., LLC

(57) ABSTRACT

A copper winding structure includes a first copper sheet having a first body, a first extending part and a second extending part located at two ends of the first body, respectively; and a second copper sheet having a second body, a third extending part and a fourth extending part located at two ends of the second body, respectively, the third extending part intersects with the fourth extending part such that the second body is partially overlapped; after the first copper sheet is stacked with the second copper sheet, the second extending part aligns with the third extending part, and the first extending part and the fourth extending part are located on the same side with respect to the second extending part and the third extending part.

12 Claims, 3 Drawing Sheets

(56) References Cited

U.S. PATENT DOCUMENTS

| | | | | |
|---|---|---|---|---|
| 2010/0026437 A1* | 2/2010 | Lin | ............... | H01F 27/2847 |
| | | | | 336/192 |
| 2012/0243278 A1* | 9/2012 | Zhang | ............... | H05K 7/1432 |
| | | | | 363/127 |
| 2014/0327511 A1* | 11/2014 | Tsai | ............... | H01F 27/28 |
| | | | | 336/220 |
| 2016/0133379 A1* | 5/2016 | Lin | ............... | H01F 27/303 |
| | | | | 336/198 |
| 2017/0271074 A1* | 9/2017 | Chou | ............... | H01F 27/29 |

* cited by examiner

COPPER WINDING STRUCTURE, TRANSFORMER AND FULL-WAVE RECTIFIER CIRCUIT HAVING THE SAME

CROSS-REFERENCE TO RELATED APPLICATIONS

This application claims priority to Chinese Patent Application No. 201721341921.X filed on Oct. 18, 2017, the entire contents of which are hereby incorporated by reference.

TECHNICAL FIELD

The present disclosure relates to a copper winding structure, a transformer and a full-wave rectifier circuit.

BACKGROUND

Copper sheets are widely used as windings of magnetic components, therefore, the copper sheets are diversified in structure forms, and develop towards more convenient operation, lower loss, higher reliability and lower costs.

FIG. 1 is a schematic diagram of a conventional copper winding structure. FIG. 2 is a circuit diagram of a full-wave rectifier circuit having the copper winding structure of FIG. 1. As shown in FIGS. 1-2, the copper winding structure comprises a first copper sheet 11 and a second copper sheet 12. The first copper sheet 11 has a first body 111, a first extending part A and a second extending part P located at two ends of the first body 111, respectively. The second copper sheet 12 has a second body 121, a third extending part Q and a fourth extending part B located at two ends of the second body 121, respectively. The first extending part A and the third extending part Q are dotted terminals, the second extending part P and the third extending part Q are connected to form a central tap O, and an arrangement structure of the extending parts are A-O-B from left to right. That is, the first extending part A and the fourth extending part B are on two sides of the central tap O. When applied to the circuit, the first extending part A and the four extending part B need to connect through the holes, which is not convenient to operate. Therefore, it is urgent to develop a copper winding structure to overcome the above shortcomings.

SUMMARY

According to some embodiments of the present disclosure, a copper winding structure is provided, The copper winding structure comprises a first copper sheet and a second copper sheet. The first copper sheet has a first body, a first extending part and a second extending part located at two ends of the first body, respectively. The second copper sheet has a second body, a third extending part and a fourth extending part located at two ends of the second body, respectively. The third extending part intersects with the fourth extending part such that the second body is partially overlapped. After the first copper sheet is stacked with the second copper sheet, the second extending part aligns with the third extending part, and the first extending part and the fourth extending part are located on the same side with respect to the second extending part and the third extending part.

According to some embodiments of the present disclosure, a transformer is provided. The transformer comprises a magnetic core and the copper winding structure according to described above, the copper winding structure is used as a primary winding or a secondary winding of the transformer.

According to some embodiments of the present disclosure, a full-wave rectifier circuit is provided. The full-wave rectifier circuit comprises the transformer according to described above; a first switch having a first terminal and a second terminal; and a second switch having a third terminal and a fourth terminal, wherein the fourth terminal of the second switch is electrically coupled with the second terminal of the first switch, the first extending part of the first copper sheet is electrically coupled with the first terminal of the first switch, and the fourth extending part of the second copper sheet is electrically coupled with the third terminal of the second switch.

DETAILED DESCRIPTION

The present disclosure will be further described below with reference to the drawings and the detailed embodiments. The embodiments provide implementing ways and operation procedures on the premise of the technical solution of the present disclosure, but the scope protected by the present disclosure is not limited to the below embodiments.

Figure 1:
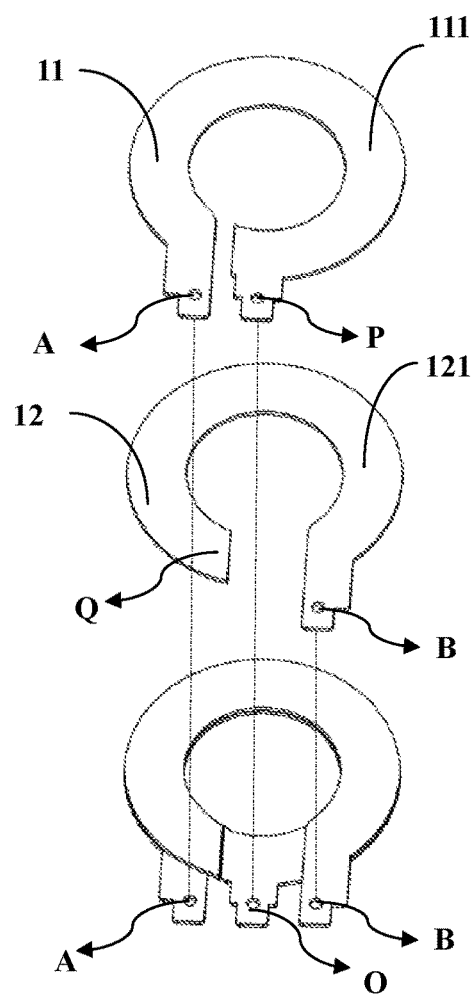
FIG. 1 is a schematic diagram of a conventional copper winding structure.
Figure 2:
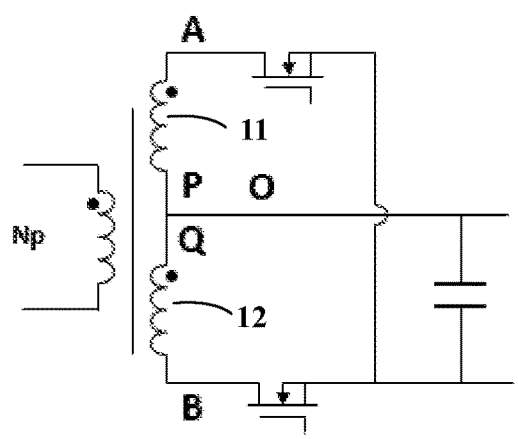
FIG. 2 is a circuit diagram of a full-wave rectifier circuit having the copper winding structure of FIG. 1.
Figure 3:
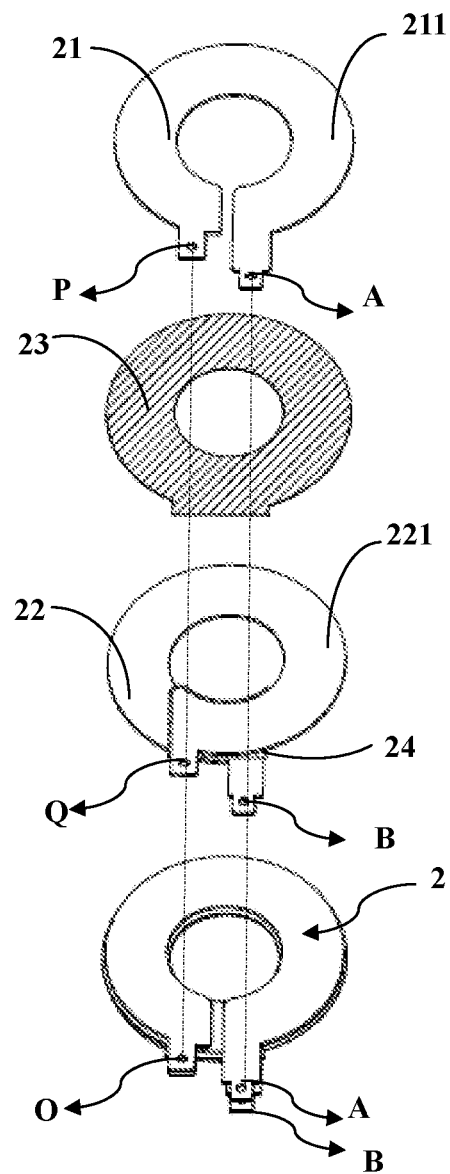
FIG. 3 is a schematic diagram of a copper winding structure according to an embodiment of the present disclosure.

FIG. 3 is a schematic diagram of a copper winding structure according to an embodiment of the present disclosure. As shown in FIG. 3, the copper winding structure 2 comprises a first copper sheet 21 and a second copper sheet 22. The first copper sheet 21 has a first body 211, a first extending part A and a second extending part P located at two ends of the first body 211, respectively. The second copper sheet 22 has a second body 221, a third extending part Q and a fourth extending part B located at two ends of the second body 221, respectively. The third extending part Q intersects with the fourth extending part B such that the second body 221 is partially overlapped. After the first copper sheet 21 is stacked with the second copper sheet 22, the second extending part P aligns with the third extending part Q, and the first extending part A and the fourth extending part B are located on the same side with respect to the second extending part P and the third extending part Q. Therefore, connection of the first extending part A and the fourth extending part B on the circuit is much more convenient.

In some embodiments, the first body 211 and the second body 221 are both annular. But the present disclosure is not limited thereto.

In some embodiments, a first insulating layer 23 is provided between the first body 21 and the second body 22, and the first insulating layer 23 at least covers overlapping area of the first body 21 and the second body 22.

In some embodiments, a second insulating layer 24 is provided between intersection overlapping surfaces of the second body. The first and second insulating layers are both insulating tapes. But the present disclosure is not limited thereto.

In some embodiments, through holes are provided on the second extending part P and the third extending part Q, and the through holes are used for receiving soldering tin when the second extending part P and the third extending part Q are connected to the circuit, so as to solder conveniently.

In some embodiments, through holes are provided on the first extending part A and the fourth extending part B, and the through holes are used for receiving soldering tin when the first extending part A and the fourth extending part B are connected to the circuit, so as to solder conveniently.

Figure 4:
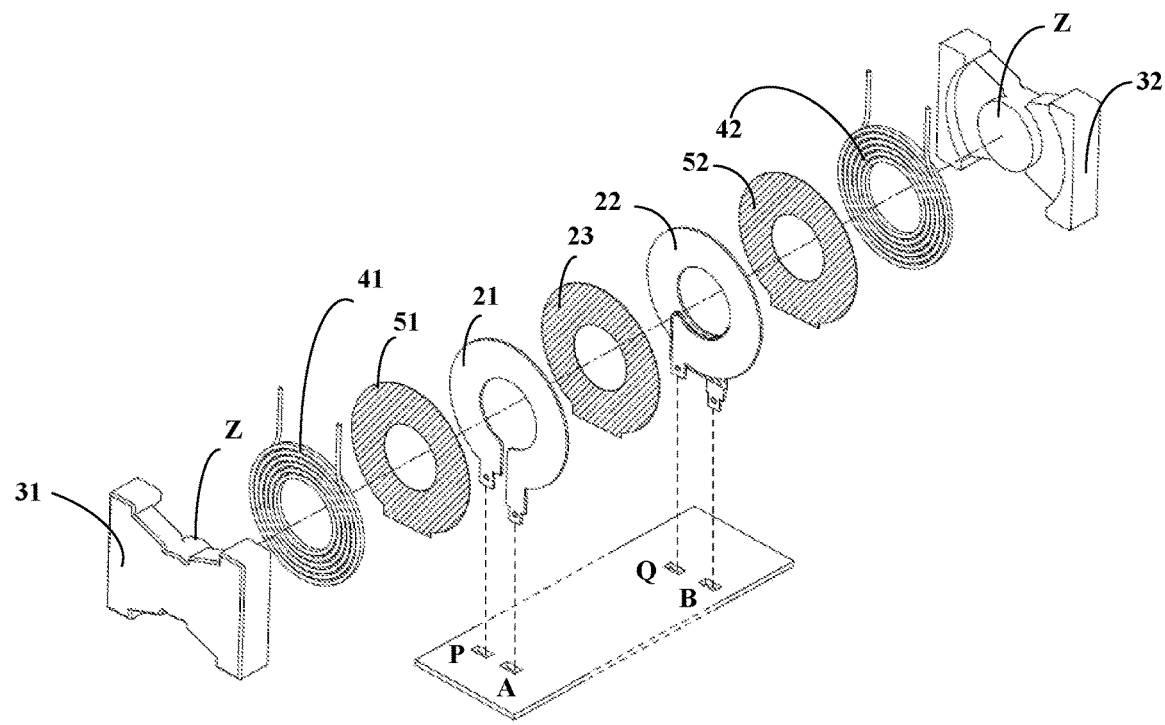
FIG. 4 is a schematic diagram of a transformer according to an embodiment of the present disclosure.

FIG. 4 is a schematic diagram of a transformer according to an embodiment of the present disclosure. As shown in FIG. 4, the transformer comprises a magnetic core, a copper winding structure 2, insulating layers 51, 52, and windings 41, 42. The magnetic core comprises a first magnetic core part 31 and a second magnetic core part 32 disposed in opposite, and the first magnetic core part 31 and the second magnetic core part 32 both have core columns Z. The copper winding structure 2 is the same as the copper winding structure shown in FIG. 3, and the detailed will not be described here. The winding 41, the insulating layer 51, the first copper sheet 21, the insulating layer 23, the second copper sheet 22, the insulating layer 52, and the winding 42 are sequentially fitted onto the core columns Z.

In some embodiments, the copper winding structure 2 is used as a primary winding or a secondary winding of the transformer, the windings 41 and 42 are used as the secondary winding or the primary winding of the transformer correspondingly.

In some embodiments, the second extending part P is electrically connected to the third extending part Q to form a common terminal O, which is used as a central tap of the primary winding, or a central tap of the secondary winding correspondingly.

It should be explained that the present disclosure does not limit the number of copper winding structures and windings.

Figure 5:
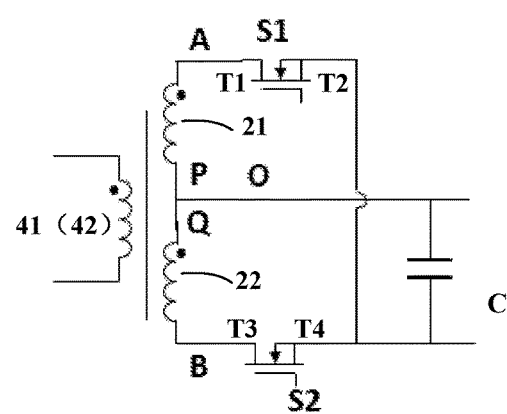
FIG. 5 is a schematic diagram of a full-wave rectifier circuit according to an embodiment of the present disclosure.

FIG. 5 is a schematic diagram of a full-wave rectifier circuit according to an embodiment of the present disclosure. As shown in FIG. 5, the full-wave rectifier circuit comprises the transformer shown in FIG. 4, a first switch S1 and a second switch S2. The first switch S1 has a first terminal T1 and a second terminal T2. The second switch S2 has a third terminal T3 and a fourth terminal T4. Wherein, the fourth terminal T4 of the second switch S2 is electrically coupled with the second terminal T2 of the first switch S1, the first extending part A of the first copper sheet 21 is electrically coupled with the first terminal T1 of the first switch S1, and the fourth extending part B of the second copper sheet 22 is electrically coupled with the third terminal T3 of the second switch S2.

Such as the full wave rectifying circuit mentioned above, the copper winding structure 2 is used as the secondary winding of the transformer.

In some embodiments, the full-wave rectifier circuit further comprises an output capacitor C, one end of the output capacitor C is electrically coupled with the fourth terminal T4 of the second switch S2 and the second terminal T2 of the first switch S1, and the other end of the output capacitor C is electrically coupled with the second extending part P of the first copper sheet 21 and the third extending part Q of the second copper sheet 22.

In some other embodiments, the output capacitor C can be replaced by other output filter circuit, as long as the output filter circuit can be used for filtering the output signal.

It should be explained that the present disclosure does not limit the number of copper winding structures and windings.

It should be explained that electrically coupling referred in the present disclosure may not only represent direct connection on the circuit, but also represent indirect connection through other devices, such as, being connected together through an inductor.

It should be explained that the first switch S1 and the second switch S2 may be MOSFET, BJT or IGBT, but the present disclosure is not limited thereto.

In summary, by the copper winding structure of the present disclosure, the first extending part and the fourth extending part are located on the same side with respect to the second extending part and the third extending part. Therefore, connection of the first extending part and the fourth extending part on the circuit is much more convenient; when it is applied to the circuit, layout of the switch components on the PCB board is also improved; and the leakage inductance of the output lead is reduced.

Although the present disclosure has been disclosed above by means of several embodiments, they are not used to limit the present disclosure. Without departing from the spirit and scope of the present disclosure, any ordinary person in the technical field of the present disclosure can make various changes and modifications, so the scope protected by the present disclosure should be determined by the scope defined in the appended claims.

What is claimed is:

1. A copper winding structure, comprising:
   a first copper sheet having a first body, a first extending part and a second extending part located at two ends of the first body, respectively; and
   a second copper sheet having a second body, a third extending part and a fourth extending part located at two ends of the second body respectively, wherein the third extending part intersects with the fourth extending part such that the second body is partially overlapped, and wherein after the first copper sheet is stacked with the second copper sheet, the second extending part aligns with and is electrically coupled with the third extending part so that the first copper sheet and the second copper sheet are connected in series, and the first extending part and the fourth extending part are located on the same side of the second extending part and the third extending part.

2. The copper winding structure of claim 1, further comprising a first insulating layer which is provided between the first body and the second body.

3. The copper winding structure of claim 2, wherein the first insulating layer at least covers overlapping area of the first body and the second body.

4. The copper winding structure of claim 1, further comprising a second insulating layer which is provided between intersection overlapping surfaces of the second body.

5. The copper winding structure of claim 1, wherein the first body and the second body are both annular.

6. The copper winding structure of claim 1, wherein through holes are provided on the second extending part and the third extending part.

7. The copper winding structure of claim 1, wherein through holes are provided on the first extending part and the fourth extending part.

8. A transformer, comprising:
a magnetic core; and
the copper winding structure of claim 1, which is used as a primary winding or a secondary winding of the transformer.

9. The transformer of claim 8, wherein a common terminal formed between the second extending part and the third extending part is used as a central tap of the primary winding or a central tap of the secondary winding correspondingly.

10. A full-wave rectifier circuit, comprising:
the transformer of claim 8;
a first switch having a first terminal and a second terminal; and
a second switch having a third terminal and a fourth terminal,
wherein the fourth terminal of the second switch is electrically coupled with the second terminal of the first switch, and the first extending part of the first copper sheet is electrically coupled with the first terminal of the first switch, and the fourth extending part of the second copper sheet is electrically coupled with the third terminal of the second switch.

11. The full-wave rectifier circuit of claim 10, wherein the copper winding structure is used as a secondary winding of the transformer.

12. The full-wave rectifier circuit of claim 10, wherein the full-wave rectifier circuit further comprises an output filter circuit,
wherein one end of the output filter circuit is electrically coupled with the fourth terminal of the second switch and the second terminal of the first switch, and the other end of the output filter circuit is electrically coupled with the second extending part of the first copper sheet and the third extending part of the second copper sheet.

* * * * *